Patented Dec. 25, 1934

1,985,239

UNITED STATES PATENT OFFICE 1,985,239

PROTECTIVE TREATMENT OF FRESH FRUIT IN PREPARATION FOR MARKET

Ernest M. Brogden, Pomona, Calif., assignor to Brogdex Company, Winter Haven, Fla., a corporation of Florida No Drawing. Application August 3, 1932, Serial No. 627,388

15 Claims. (Cl. 91—68)

This invention relates to protective treatment of fresh fruit in preparation for market; and it relates particularly to a process of providing fresh fruit with a protective coating adapted to retard withering or shrinkage of fruit and also to impart to its surface a relatively high degree of shine or polish, the process being essentially characterized by the fact that the desired coating is virtually a combination of two coatings of quite different character successively applied, the first coating consisting of sealing material which is relatively soft and easily spreadable over the surface of the fruit in a thin film adhering firmly to the fruit surface, while the material of the second coating superimposed upon the first is much harder and more brittle and, although it would be incapable of adhering so well directly to the fruit surface, is capable of adhering firmly to the first coating and of imparting a substantially higher degree of shine or luster than is the softer material of the first coating. The combined or multiple coating is so thin and filmlike as not to completely seal the surface of the fruit and thereby prevent transpiration, while at the same time it exerts a sealing effect sufficient to retard greatly the rate at which the moisture of the contained fruit juices would normally evaporate if the fruit were untreated.

During the last decade, the art of preparing fresh fruit for market has undergone revolutionary changes owing to the introduction for the first time of practical methods of controlling decay and withering in commercial shipments of fruit to market by the application of certain chemical agents and other protective materials. With respect to the application of protective coatings to retard withering and keep the fruit plump and firm, remarkable results have been attained by the proper application of waxy material, such as paraffin, employing the procedure and apparatus of the general type disclosed in this applicant's prior Patent No. 1,641,112, for example. It has been found, however, that while the application of paraffin in this manner is entirely satisfactory from the standpoint of preventing withering and keeping the fruit plump and firm, it often lacks sufficient shine or polish to suit the trade at the marketing centers to which the fruit is shipped. This is seized upon by purchasers as an excuse for demanding price reductions, thus cutting down the net returns to the grower and shipper. However illogical and unsound may be the attitude of the trade in this respect, it is a well known fact that the surface appearance of fresh fruit in the market, and particularly the degree of shine or polish it exhibits, is a very important factor in determining the price it will bring. Consequently it is of the utmost importance for the fruit packer and shipper to see to it that this trade requirement be met if at all possible.

In spite of the very large amount of research and development work which has been devoted to the problem of getting good shine or polish on fruit provided with a protective coating of sealing material as generally referred to above, no thoroughly satisfactory solution of the problem has been found heretofore. The many factors and limitations which have to be taken into account in working out a practical method of protectively coating fresh fruit greatly complicate the problem. The sensitiveness of fruit to surface injury and the further requirement that whatever sealing material be used must be of such character and so applied to the fruit as to be practically imperceptible upon casual inspection are considerations which greatly restrict the field of choice and increase the difficulties to be overcome. In addition, the coating must adhere firmly to the fruit and, although it must present an exterior surface hard enough to give a permanent shine or luster, it must possess substantially no tendency to crack or flake off upon handling or exposure to wide variations in atmospheric temperature and humidity. To meet all these many essential conditions and requirements in a procedure which is sufficiently simple and inexpensive to be commercially feasible has been the goal toward which the practical art has been striving but has been unable wholly to achieve until now.

Relatively soft waxy material, such as ordinary paraffin wax of good commercial grade, is an ideal sealing material for the purpose of retarding withering of the fruit without at the same time so completely sealing its surface as to prevent "breathing" or transpiration and thereby causing rancidity. By admixing therewith a solvent or other softening agent, or by the use of moderate heating, a material like paraffin can be readily spread uniformly over the entire surface of the fruit in such manner as to work its way into every surface porosity, even though in minute quantity. By reason of the relatively soft character of a sealing material like paraffin which enables spreading it intimately into contact with the fruit surface at all points, the finally resulting film of solid sealing material adheres firmly to the entire surface of the fruit and is indeed virtually in locking engagement therewith through its penetration into minute surface porosities. Moreover, the somewhat oily character of paraffin and other relatively soft waxy materials makes them peculiarly compatible with the surface of fruits, the rind or skin of which is in practically all cases characterized by the presence of natural oils and waxes to a greater or less degree.

Unfortunately, however, these protective materials, which, like paraffin wax, are especially well adapted to provide suitable protective coatings for fruit by reason of their softness and easy spreadability, compatibility with the fruit rind, and other desirable characteristics, are not such as will impart to fruit the degree of shine or luster insisted upon by the trade. Accordingly, numerous proposals have been advanced, most of them highly impractical and in many cases calculated to injure the fruit and destroy its commercial value, for achieving the desired degree of shine or polish and at the same time keeping the fruit plump and unwithered. Some of these proposals have indeed enabled giving the fruit a high degree of shine, but they have either failed to retard withering substantially, or have gone to the opposite extreme and sealed the fruit so completely as to stop transpiration and cause the fruit rapidly to become rancid and therefore worthless, or have otherwise proved to be impracticable.

If it be attempted to apply to the fruit surface, in place of a relatively soft sealing material, a sealing material which is much harder but which has high luster-imparting properties, the results are usually far from satisfactory. Carnauba wax, for example, is very hard and of much higher melting point than paraffin wax. It can be spread over a surface in molten condition and, after hardening, will give a high polish when rubbed or burnished; or it can be incorporated in solutions or emulsions which, upon drying, leave a shiny surface. But carnauba wax alone, applied directly to the surface of fresh fruit in any of these ways, does not provide a satisfactory coating. Unlike coatings of softer sealing materials, a carnauba wax coating so applied does not adhere sufficiently well to the surface of fruit but tends to separate therefrom and to flake off. This objection is the more pronounced because the greater density and imperviousness of such harder wax renders it particularly difficult to get a film thereof on the fruit sufficiently thin to avoid undue interference with transpiration; and even if this requirement be met, the brittleness of the wax renders the film too fragile and lacking in toughness especially in view of its imperfect adherence to the fruit surface.

The foregoing difficulties and objections have been overcome to a considerable extent by proceeding in accordance with a method developed by this applicant and another, and now in extensive commercial use. That method employs a waxy composition obtainable by melting paraffin wax and carnauba wax together and rubbing it on the fruit in a heated chamber; but in order to obtain the necessary toughness and firm adherence of the protective film coating to the fruit surface, it is necessary that the composition contain such a high percentage of paraffin that, although the resultant shine or polish is superior to that obtained when paraffin wax alone is employed, it still falls short of what a considerable proportion of the trade insists upon. Moreover, even with this large proportion of paraffin in the composition, the presence of the carnauba wax therein increases the melting point disproportionately, the melting point of a mixture consisting of 90 per cent paraffin and 10 per cent carnauba wax being approximately 172° F., for example, as compared with an average melting point of around 125°–130° F. for commercial grades of paraffin wax. Consequently in applying such a composition by means of the general type of procedure and apparatus disclosed in the aforesaid patent to Brogden No. 1,641,112, or in the patent to Skinner No. 1,830,297, it is necessary for the attainment of best results to maintain the environment at a relatively high temperature, say 180°–220° F., in the housing or chamber in which the fruit is brushed or rubbed for a period of from 15 to 30 seconds. For a fruit-handling unit of large capacity, this means a substantial outlay for installation and upkeep of heating equipment and of the temperature-controlling devices which must be used in order to regulate the temperature properly. Considerable skill is also required on the part of the operator in maintaining just the right operating conditions. The unusually high temperatures employed require that the fruit be handled with the utmost care in going through the treating system since fresh fruit is easily damaged by overheating. All these factors obviously add to the trouble and expense of handling the fruit. Furthermore, although this has proved by far the most satisfactory method heretofore known for obtaining adequate retardation of withering, and although the shine or polish obtained is materially better than where paraffin alone is used, it is a fact as already pointed out hereinabove that the method does not fully meet the demands of the trade in the latter respect, so that the need for a more completely satisfactory solution of the problem has been apparent for a long time.

After long and expensive research work on this problem, it has been found by the present applicant that the requirements both as to retardation of withering and also as to high degree of shine or polish on the fruit can be fully met in a satisfactory manner by a novel procedure in which the provision of an incompletely sealing protective coating is accomplished in two successive steps, the final resultant coating being virtually a combination of two very thin film-coatings or layers of different character which tenaciously adhere to each other, and the assemblage or multiple-layer coating as a whole being tenaciously adherent to the surface of the fruit. The coating first applied consists of a relatively soft easily spreadable sealing material which is compatible with the fruit surface and, when properly applied, contacts intimately therewith and adheres firmly thereto. The sealing material of this initial coating, however, is such as will not enable the desired high degree of shine or polish to be imparted to the fruit surface, but it functions efficiently to effect the desired incomplete sealing of the fruit surface and, indeed, is principally relied upon for this purpose. The second or superimposed coating is radically different in character from the first. Its principal constituent is a material which, while also broadly classifiable as a sealing material, functions more especially as a shine- or luster-imparting agent; and it is much harder and more brittle than the material of the underlying coating. Nevertheless, this harder material must be of such character as to be compatible with the material of the underlying coating and therefore to be capable of uniting firmly with such underlying coating to such an extent as to be substantially integral therewith, notwithstanding the fact that such harder material may be relatively incompatible with the fruit surface itself and incapable of satisfactorily firm adherence thereto by direct contact therewith.

Although the invention may be satisfactorily practiced in various specific ways embodying its underlying principles, it has been found that particularly good results can be attained if the first or underlying coating of relatively soft sealing material be applied to the fruit in any of the ways heretofore known to accomplish retardation of withering satisfactorily. The material so applied should consist of or mainly comprise a comparatively soft and easily spreadable sealing material of proper character, such as paraffin, for example. To the fruit so coated is then applied a small quantity of a suitable harder or more brittle sealing material which is relied upon to impart the desired high degree of shine or luster. Most advantageously, this harder material is applied in the form of powder or dust, the fruit being then thoroughly brushed or otherwise rubbed and burnished to effect the desired cohering union of this latter material with the underlying coating of softer material and to develop the desired shine or polish on the finished coating.

In one particularly desirable practical procedure within the scope of the invention, fresh fruit such as oranges, for example, which usually has undergone preliminary treatment including washing and surface-drying, is first provided with a very thin film-like coating of paraffin wax by atomizing or spraying upon the fruit a small quantity of molten paraffin and thoroughly rubbing the fruit on rotary brush rolls for a period of from 15 to 30 seconds, for example, while maintaining the environment in which the fruit is being brushed at a temperature approximating 130°-140° F. This moderate degree of heat is economical to maintain and, since it entails little risk of injury to the fruit, the operation does not require highly skilled supervision or the use of expensive regulating means. After the fruit has been thus treated, and most desirably before the paraffin coating has fully set or hardened, a small quantity of finely powdered carnauba wax is applied to each orange in any suitable manner and the fruit is then subjected to further rubbing by rotary brush rolls for a short period of time which may be from 10 to 15 or 20 seconds in a typical instance, although longer brushing is permissible so long as it is not so extensive as to cause possible mechanical injury to the skin of the fruit. The application of the powdered carnauba wax to the fruit may be accomplished, for example, by sifting or sprinkling the powder upon the oranges after they emerge from the initial rotary brush roll unit in which the paraffin coating is applied and just before it reaches the rotary brush rolls of the second brushing unit. Or, the fruit as it comes from the first brushing unit may be caused to roll over a surface upon which the powdered wax is spread, thus taking up a small quantity thereof. Either of these methods, or any other way of bringing a small quantity of wax powder or dust into contact with the surface of the fruit after it has received the paraffin coating, may be employed within the scope of the invention. While the application of the powdered wax does not necessarily have to be effected before the initial paraffin coating has normally set or hardened, it is practically very advantageous that this procedure be followed because, under such conditions, the surface of the fruit is still slightly tacky and the powdered wax will therefore most readily and easily adhere to it. This facilitates getting the desired quantity of powder on the fruit quickly. However, even if the paraffin coating be first allowed to harden, a sufficient quantity of the finely powdered wax can be made to adhere to the paraffin coating, especially if the powder be continually sifted on the fruit while it is being brushed or rubbed, or if the rubbing be effected in a chamber wherein an air suspension of the very fine solid particles of the hard wax is maintained in contact with the fruit. By the action of the brushing mechanism, the almost impalpably fine particles of the carnauba wax powder are spread uniformly over the entire surface of the fruit and made to form an extremely thin and smooth superimposed coating of the harder waxy material firmly united with the underlying softer coating of paraffin and presenting a finished outer surface possessing fine gloss or polish. In this brushing or rubbing of the fruit after application of the hard wax powder, it is unnecessary to apply heat since a high degree of shine or luster can be produced on the fruit by conducting the operation at ordinary atmospheric temperature. In fact, omission of heating is preferable because disturbance of the underlying layer, which is chiefly relied upon for sealing effect, is thus minimized.

In another practical embodiment of the invention which, however, is not generally as satisfactory as that which has just been described hereinabove, the initial coating of relatively soft sealing material can be applied either in the cold or with the aid of very gentle heating at temperatures materially lower than 130° F. and only slightly exceeding atmospheric temperature. Thus, blocks or slabs of paraffin wax can be pressed against rotary brushes which latter remove particles of the wax from the slabs and transfer the same to the surface of fruit caused to travel along said brushes, paraffin thus being distributed to a greater or less extent over the surface of the fruit, under proper conditions of operation, to provide a coating effective in some degree to retard withering. One form of apparatus by which such application of paraffin can be made is shown in the patent to Haworth No. 1,703,144. If fruit thus initially treated be then further treated by application of wax powder or dust and further brushing or rubbing, as described, not only is the fruit given a high degree of shine or polish but the final multiple-layer coating is materially more effective to retard withering than was the initial paraffin coating.

In still another embodiment of the invention, the initial coating of sealing material may be provided by applying the sealing material to the fruit in the form of an emulsion, either with or without rubbing or brushing. For example, a suitable emulsion for this purpose may comprise, say, 5 to 10 parts paraffin wax and a small percentage (e. g. 1 part) of a non-volatile white mineral oil, emulsified by admixing with 1 or 2 parts each of borax and a fatty acid such as stearic or oleic acid and suitably agitating with water, the resultant mixture being made up to 100 parts by addition of water; all parts being by weight.

It is also within the scope of the invention, for example, to apply wax powder to fruit after it has been provided initially with a coating of a composition comprising paraffin in admixture with a harder sealing material, such as a composition comprising 90 per cent paraffin and 10 per cent carnauba wax and applied by rubbing at relatively high temperatures, as hereinabove described. Compositions of this character, while not consisting wholly of a relatively soft sealing material, contain a relatively soft sealing material in preponderating proportion and are therefore characterized by inability to impart to fruit the high degree of shine or polish attainable by the present process. Such compositions are therefore to be understood as included within the generic expression "relatively soft sealing material."

Although application of the relatively hard sealing material in the form of powder or dust thoroughly rubbed over the fruit as above described is by far the best procedure to use in practicing the invention both because of its simplicity and because of the superior results thereby obtainable, it is to be understood that the invention is not restricted to such procedure. Application of the harder sealing material in the form of a suitably dilute solution or emulsion, in which the fruit previously treated with softer coating material is dipped or with which it is sprayed or sprinkled, enables realization of the benefits of the invention to a substantial extent, and in its broader aspects the invention includes such procedures. Among other materials besides carnauba wax suitable for use as gloss- or luster-imparting agents in practicing the invention may be mentioned waxes or wax-like substances generally, as well as gums, natural or synthetic, which are much harder than paraffin and which adhere well to an underlying layer of paraffin-like material and enable production of a substantially permanent high luster finish substantially free from tackiness or stickiness and substantially unaffected in these respects by variations in atmospheric temperature.

The use of moderately hardened (e. g. hydrogenated) oils and fats in place of paraffin as the principal stopping or sealing material for coating fruit to retard withering is also made practicable by the present invention. While such moderately hardened oils and fats, especially when mixed with substances like paraffin and/or lanolin, form good film coatings which adhere well and their use would be highly desirable from certain standpoints, it has not been practicable to employ them in this connection heretofore because fruit coated with them looked lifeless and dull, and there was no known way to overcome this defect. By proceeding in accordance with the present invention, the underlying coating adhering directly to the fruit rind may consist wholly or partly of a hardened oil or fat, applied in the same manner as a paraffin coating; and a secondary coating of luster-imparting material may be superimposed upon and united therewith. Such a moderately hardened oil or fat may be generically designated as waxy or wax-like material somewhat resembling paraffin in physical characteristics.

It will be noted that in the best embodiments of the invention, whether the initially applied coating of paraffin or paraffin-like material is or is not permitted to completely set or harden before applying the final coating of luster-imparting material, said initially applied coating has always assumed definite form before the luster-imparting material is applied. Consequently the extreme outer surface of the finished multi-layer coating contains little or none of the softer material of the coating first applied but consists practically wholly of the harder material capable of imparting high luster.

Ordinarily the quantity of material used to form the second or outer coating is much smaller than that used to form the initial or underlying coating. In a typical instance, where oranges are being treated, the quantity of paraffin or like sealing material applied in forming the initial coating will approximate from 6 to 10 pounds per California fruit carload averaging, say, in the neighborhood of 75,000 oranges; whereas the quantity of harder material applied in the second coating step will usually not exceed from one-quarter to one-half as much.

What is claimed is:

1. In the preparation of fresh fruit for market, the process of protectively coating fruit to retard withering thereof which comprises initially providing fresh fruit with a film-like coating of relatively soft though substantially solid sealing material which is easily spreadable uniformly over the surface of the fruit into a firmly adherent coating, and then superimposing thereupon a second thin coating of sealing material which is capable of imparting better shine or polish than the first mentioned material and is so much harder and more brittle that it would not by itself adhere as well directly to the fruit surface, the quantity of both sealing materials thus applied being so limited and adjusted that the combined coatings are practically imperceptible and do not completely seal the fruit surface and prevent transpiration but are effective to materially retard evaporation of moisture from the fruit.

2. In the preparation of fresh fruit for market, the process of protectively coating fruit to retard withering thereof which comprises initially providing fresh fruit with a film-like coating of relatively soft waxy material, and then superimposing thereupon a film-like coating of much harder waxy material capable of producing a high luster and of adhering firmly to such underlying coating, but too hard and brittle for satisfactory adherence directly to the fruit surface, the quantity of both materials being so limited and adjusted that the combined coatings are practically imperceptible and do not completely seal the fruit surface and prevent transpiration but are effective to materially retard evaporation of moisture from the fruit.

3. In the preparation of fresh fruit for market, the process of protectively coating fruit to retard withering thereof which comprises initially providing fresh fruit with a film-like coating of waxy material comprising paraffin, and then superimposing thereupon a film-like coating of a harder waxy material comprising carnauba, the quantity of both materials being so limited and adjusted that the combined coatings are practically imperceptible and do not completely seal the fruit surface and prevent transpiration but are effective to materially retard evaporation of moisture from the fruit.

4. In the preparation of fresh fruit for market, the process of protectively coating fruit to retard withering thereof which comprises rubbing sealing material consisting principally of paraffin wax over the surface of fresh fruit to form a film-like coating thereon, then further rubbing thereover a much harder waxy material of luster-imparting properties in solid pulverulent form until a very thin layer of such harder waxy material presenting a lustrous outer surface is formed and firmly united to the underlying coating, the quantity of both materials being so limited and adjusted that the combined coatings are effective to retard withering materially but are insufficiently thick to seal the fruit surface completely and prevent transpiration.

5. In the preparation of fresh fruit for market, the process of protectively coating fruit to retard withering thereof which comprises rubbing sealing material consisting principally of paraffin wax over the surface of fresh fruit with the aid of heat to form a film-like coating thereon which remains somewhat tacky for some time after formation, applying to the fruit while such coating is still tacky a much harder waxy material in solid pulverulent form, and then further rubbing the fruit until a very thin layer of such harder waxy material presenting a lustrous outer surface is formed and firmly united to the underlying coating, the quantity of both materials being so limited and adjusted that the combined coatings are effective to retard withering materially but are insufficiently thick to seal the fruit surface completely and prevent transpiration.

6. In the preparation of fresh fruit for market, the process of protectively coating fruit to retard withering thereof which comprises rubbing fruit with sealing material consisting principally of paraffin wax in an environment heated to a temperature at which the material will spread easily until the fruit is provided with an adherent film-like protective coating, then applying to the fruit, before said coating has fully hardened, carnauba wax in solid pulverulent form, and further rubbing the fruit without application of heat until the powdered wax has been distributed uniformly over the fruit and has formed an adherent lustrous finish coating, the quantity of both materials being so limited and adjusted that the combined coatings are effective to retard withering materially but are insufficiently thick to seal the fruit surface completely and prevent transpiration.

7. The process set forth in claim 1, further characterized by the fact that the quantity of harder material applied in the second coating step does not exceed from one-quarter to one-half that of the softer material applied in the first coating step.

8. The process set forth in claim 2, further characterized by the fact that the quantity of harder material applied in the second coating step does not exceed from one-quarter to one-half that of the softer material applied in the first coating step.

9. The process set forth in claim 3, further characterized by the fact that the quantity of harder material applied in the second coating step does not exceed from one-quarter to one-half that of the softer material applied in the first coating step.

10. The process set forth in claim 4, further characterized by the fact that the quantity of harder material applied in the second coating step does not exceed from one-quarter to one-half that of the softer material applied in the first coating step.

11. The process set forth in claim 5, further characterized by the fact that the quantity of harder material applied in the second coating step does not exceed from one-quarter to one-half that of the softer material applied in the first coating step.

12. The process set forth in claim 6, further characterized by the fact that the quantity of harder material applied in the second coating step does not exceed from one-quarter to one-half that of the softer material applied in the first coating step.

13. In the preparation of fresh fruit for market, the process which comprises initially providing the surface of fresh fruit with a thin, film-like, relatively soft but substantially solid coating of coherent sealing material which is non-injurious to the fruit and adheres well thereto without substantial flaking off, and then superimposing a still thinner coating of a materially harder and more brittle coating material of greater density and imperviousness which adheres firmly to the initial coating but would not adhere well to the uncoated fruit surface and which has the property of imparting a better surface luster or finish to the fruit than does the material of the initial coating, the total thickness of the combined coatings being sufficient to materially retard evaporation of moisture from the fruit but insufficient to seal the fruit so completely as to prevent breathing or transpiration.

14. The process set forth in claim 4, further characterized by the fact that the application of said harder waxy material is effected substantially at ordinary atmospheric temperature.

15. The process set forth in claim 5, further characterized by the fact that the application of said harder waxy material is effected substantially at ordinary atmospheric temperature.

ERNEST M. BROGDEN.